Patented Dec. 23, 1947

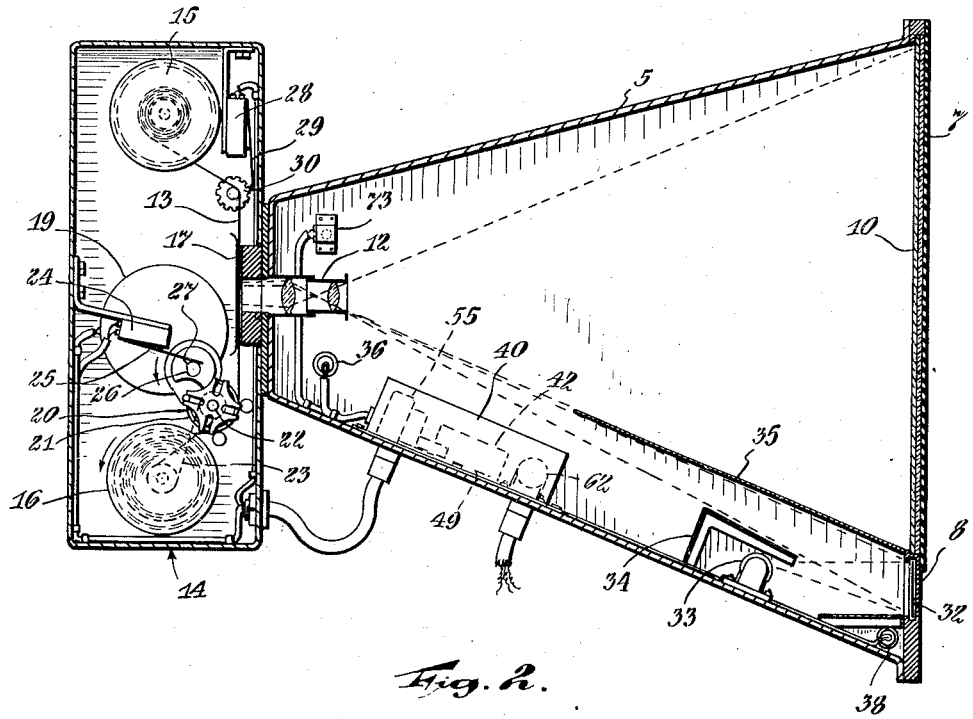
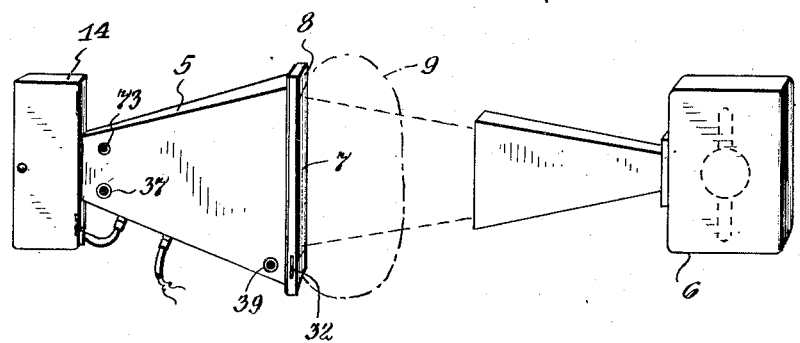
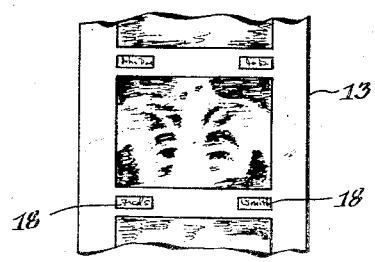

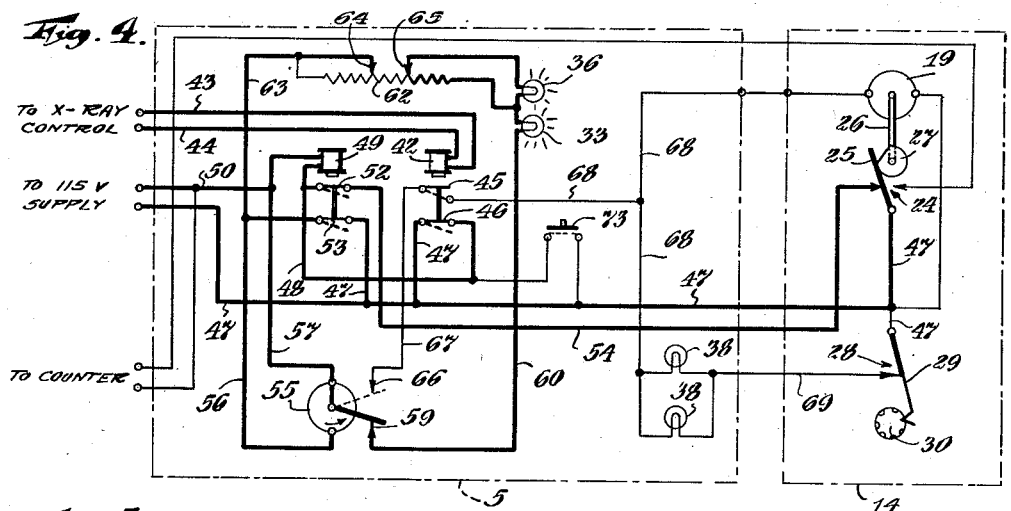

2,433,129

UNITED STATES PATENT OFFICE 2,433,129

PHOTOFLUOROGRAPHIC CAMERA AND CONTROL

Chester B. Land, Catonsville, Md., assignor to Westinghouse Electric Corporation, East Pittsburgh, Pa., a corporation of Pennsylvania Application December 30, 1943, Serial No. 516,220

7 Claims. (Cl. 250—65)

1

The present invention relates to X-ray apparatus and more particularly to such apparatus now known to the art as photofluoroscopic apparatus.

Apparatus of this type at the present time is being used quite extensively in industry for the purpose of making permanent records of employees and the inspection of material and products. The armed services are likewise employing apparatus of this type to examine candidates. The advantage of this apparatus over conventional types resides in the rapidity with which successive exposures can be made and the fact that since motion picture film is employed there is a considerable decrease in the cost per exposure.

The present invention has for its primary object the provision of improved photofluoroscopic apparatus which assures rapid examination of persons or objects and wherein operation of the apparatus is entirely automatic once it is set in motion by the operator.

Another object of the present invention is the provision of photofluoroscopic apparatus, which automatically operates to take successive exposures and wherein each exposure is properly identified so as to distinguish one from the other.

Another object of the present invention is the provision of photofluoroscopic apparatus wherein operation of the various parts automatically follows in predetermined sequence upon initiation of operation by an operator.

Another object of the present invention is the provision of a photofluoroscopic apparatus wherein an indication is given to the operator of the precise condition of the apparatus during each phase of its operation.

A further object of the present invention is the provision of a photofluoroscopic apparatus wherein the photographic camera although disposed in the direct path of the beam of X-rays is protected therefrom with the film being sensitive only to visible light and thus photographically records merely the image cast on the fluorescent screen.

Still further objects of the present invention will become obvious to those skilled in the art by reference to the accompanying drawings wherein:

Figure 1 is a cross-sectional view of the camera and hood portion of the photofluoroscopic apparatus of the present invention, Figure 2 is a schematic drawing showing the relative positions of the camera and hood together with the X-ray tube and object,

2

Figure 3 is an illustration of a portion of the developed film, and

Figures 4 to 6, inclusive, are schematic diagrams of the control circuits for the photofluoroscopic apparatus of the present invention and showing the different circuits during various phases of operation of the apparatus.

Referring now to the drawings in detail, the apparatus as shown in Fig. 1 comprises a lighttight hood 5 having converging sides so that the rear thereof is of smaller area than the front. The front of the hood which, as shown in Fig. 2, is closest to the X-ray tube assembly 6 is closed by a fluorescent screen 7 held in place by a frame 8. In order to prevent the beam of X-rays, after passing through an object 9 (Fig. 2), from also passing through the screen 7 and yet allow visible light to pass through the screen, the latter is backed by a lead-glass plate 10.

The rear of the hood is closed except for an opening through which extends a telescopically adjustable lens arrangement 12 aligning with a film 13 housed within a photographic camera 14. As shown in Figs. 1 and 2, the camera is detachably secured to the exterior of the rear surface of the hood 6 and is provided interiorly with a light-tight feed-reel 15 and a similar light-tight take-up-reel 16 with the continuous strip of motion picture film 13 passing intermittently through the film guide 17 from the feed-reel 15 to the take-up-reel 16. This motion picture film 13 is of the customary type except that it is of about 46 mm. width in lieu of the usual 35 mm., but which gives a full 35 mm. image plus identifying indicia 18 as shown in Fig. 3.

For the purpose of intermittently advancing the film one frame at a time, the camera 14 is provided with an electric motor 19, commonly known as a "Barber Colman motor," which operates a "Geneva" gear arrangement 20. Inasmuch as the film 13 passes over a rubber roller 21 provided on the shaft 22 with the driven wheel or the "Geneva" cross, and the take-up reel 16 is connected by a belt 23 to this same shaft 22, the film is advanced one frame upon operation of the motor 19, since the "Geneva" cross is rotated sufficiently by the driving member on shaft 26 for this purpose. If desired in the conservation of space within the camera, the "Geneva" drive may be designed so as to rotate the "Geneva" cross two quarter revolutions to one revolution of the driving member. It will also be noted from Fig. 1 that a double-pole switch 24 known as a "micro-switch," is mounted on a bracket interiorly of the camera 14 with its operating arm 25 engaging the shaft 26 of the "Geneva" driving gear, the latter of which is provided with a flattened portion thus forming a cam 27. A similar single-pole "micro-switch" 28 is also mounted interiorly of the camera with its operating arm 29 engaging a notched roller 30 over which the film 13 passes during its advance so that this roller is rotated by movement thereof.

In order to identify each photographic exposure the front of the hood 5 is provided with a slot 32 into which plates or cards bearing desired markings can be slid. For the purpose of illuminating these markings so they appear on the film (as at 18 in Fig. 3) a tubular electric lumiline lamp 33 is disposed within the hood with direct radiation being prevented from striking the lens arrangement 12 by an angular shield 34. In a similar manner a shield 35 prevents light rays from the lamp 33 from striking the fluorescent screen 7 thus resulting in only reflected light from the plate or card 32 passing through the lens arrangement 12 and registering on the film 13. A small indicating lamp 36, observable from the outside of the hood through a glass jewel 37 and connected in electrical parallel with the lumiline lamp 33, serves to show proper functioning of the lumiline lamp circuit. A pair of similar indicating lamps 38, one on each side of the hood 5 and observable through a glass jewel 39, are provided for indicating to the operator the proper advancement of the film 13, being under control of the micro-switch 28. There is also disposed in the hood 5 a pair of relays and a time delay motor commercially known as a "Haydon" motor, shown generally at 40 in Fig. 1, all of which operate to perform certain functions as can be better appreciated by reference to Figs. 4, 5 and 6.

Referring now to these latter figures it will be noted that one of these relays has its winding 42 connected by a pair of conductors 43 and 44 to the X-ray tube control (indicated by the legend "To X-ray control") so that such winding is energized by operation of the control for the X-ray tube and remains energized for a short period of time after the exposure of the object 9 to the beam of X-rays from the tube 6 (Fig. 2). Such relay is provided with a pair of normally closed contacts 45 and a pair of normally open contacts 46 so that upon energization of the relay winding 42 their normal positions are respectively reversed. Closure of contacts 46 completes a circuit from a source of supply of the customary domestic potential of 115 volts which extends through a conductor 47 to the contacts 46 thence by a conductor 48 to the winding 49 of the other relay and back to the opposite side of the supply source through a conductor 50.

Energization of the relay winding 49 accordingly causes closure of its respective pairs of normally open contacts 52 and 53 with the contacts 52 completing a self-holding circuit for the relay winding 49. This latter circuit extends from conductor 47 (and constituting one side of the 115 volt source of supply) through one pole of double-pole micro-switch 24, thence by a conductor 54 and relay contacts 52 to conductor 48 (constituting one end of relay winding 49) and from the relay winding back to the source of supply through conductor 50 as previously described. Accordingly the relay winding 49 is thus energized by a self-holding circuit independent of the circuit initially completed through the relay contacts 46 in response to operation of the "X-ray control."

At the same time, relay contacts 53 complete a circuit to the time delay or "Haydon" motor 55 which extends from the conductor 47 (constituting one side of the 115 volt source of supply) through relay contacts 53 and a conductor 56 to one side of the motor 55 and thence by means of a conductor 57 to a junction with conductor 50 which constitutes the other side of the supply source. In the normal position of the time delay or "Haydon" motor 55 its normally closed contacts 59 complete a circuit from the conductor 57 (now carrying current of one instantaneous polarity) through motor contacts 59 and a conductor 60 to the lumiline lamp 33 and indicating lamp 36 and thence through an adjustable resistance 62 and conductor 63 back to a junction with conductor 56 which at the moment is carrying current of opposite instantaneous polarity to that of conductor 56. It will be noted that the resistance 62 is provided with adjustable taps 64 and 65 for the purpose of controlling the intensity of the lumiline lamp 33 and also to decrease the voltage supplied to the indicating lamp 36.

When the X-ray tube 6 (Fig. 2) is energized, an image of the object 9 will accordingly be cast upon the fluorescent screen 7 with passage of the X-ray beam interiorly of the hood 5 and fogging of the film being prevented by the lead glass 10. However, the image appearing on the screen 7 will be registered on the film 13 since the lead-glass is transparent to visible light. At the same time the relay winding 42 will be energized by the "X-ray control" as previously mentioned, with completion of the above described circuits as shown by the heavy lines in Fig. 4. The lumiline lamp 33 being accordingly energized it illuminates the plate or card 32 allowing registration thereof on the film 13 at the same time as the image cast on the fluorescent screen 7.

However, energization of the time delay or "Haydon" motor does not immediately cause it to operate but there is a preselected time delay during which the lumiline lamp 33 and indicating lamp 36 remain lighted. Upon expiration of this time period, the motor 55 operates opening contact 59 and closing contact 66, with opening of contact 59 interrupting the circuit to the lumiline lamp 33 and indicating lamp 36. In the meantime relay winding 42 will have been deenergized, by operation of the "X-ray control" following deenergization of the X-ray tube 6 (Fig. 2), with return of its contacts 45 and 46 to their normally closed and open positions respectively. Thus upon closure of contact 66 various circuits will be closed such as shown by the heavy lines in Fig. 5.

For example, the previously described self-holding circuit for relay winding 49 will remain closed. A circuit will now be closed, however, which extends from conductors 50 and 57 (constituting one side of the supply source) through motor contact 66, a conductor 67, closed relay contacts 45 and a conductor 68 which branches and extends to one side of camera motor 19 and one side of the indicating lamps 38. From the other side of lamps 38 the circuit continues through a conductor 69 and micro-switch 28 to conductor 47, the latter of which is line conductor carrying current of opposite instantaneous polarity to that of conductor 50. Likewise the opposite side of camera motor 19 is connected to line conductor 47 so that the motor is energized simultaneously with lighting of the indicating lamps 38.

Camera motor 19 accordingly rotates with accompanying rotation of the "Geneva" drive 20 and movement of film 13 one frame. Since film 13 passes over notched roller 30 causing rotation thereof this will in turn cause intermittent movement of single pole micro-switch arm 29 with making and breaking of its contacts thus causing flashing of the indicating lamps 38 showing that the film is properly moving from one frame to another.

Rotation of the camera motor 19 also causes rotation of the shaft 26 and naturally rotates the cam 27 carried thereby until the flattened surface engages micro-switch arm 25 after completion of the cycle of operation, as hereinafter described. This accordingly opens the micro-switch contacts interrupting the self-holding circuit for relay winding 49 thus deenergizing the winding with return of its contacts 52 and 53 to their respective normally open position. At the same time the arm 25 of double-pole micro-switch 24 closes a circuit through another of its contacts which extends from the arm 25 (which being connected to line conductor 47 constitutes one side of the supply source as previously explained) and from the switch contact through a conductor 70 to one side of a counter (not shown but indicated by the legend "To counter") for registering the number of film frames exposed, and from the other side of the counter back through a conductor 72 to a junction with the conductor 50 constituting the other side of the supply source, as shown by the heavy lines in Fig. 6.

Closure of this counter circuit is, however, only momentary because, even though camera motor 19 is deenergized by time delay motor 55 causing interruption of the circuit at contact 66 simultaneously with deenergization of the latter motor by opening of relay contacts 53, the momentum of camera motor 19 is sufficient to cause rotation thereof until the switch arm 25 again rides on the rounded portion of cam 27, as shown in Figs. 4 and 5. Thus the period of time during which switch arm 25 engages the contact to complete the counter circuit is very short since after only approximately a second or so of engagement with the flattened portion of the cam 27 the switch arm 25 again engages the contact in the self-holding circuit for relay winding 49 by riding on the rounded surface of cam 27.

It is to be noted, however, that this self-holding circuit for relay winding 49 is not again completed by such re-engagement of switch arm 25 at this time, as the self-holding circuit is interrupted by the open position of relay contacts 53. Also upon deenergization of time delay motor 55 the momentum is sufficient to re-establish engagement of contact 59 to condition the lumiline lamp 33 and indicating lamp 36 for operation upon re-starting of the time delay motor 55, so that the camera motor 19 remains inoperative until the time delay motor 55 again causes engagement of contact 66 in the above mentioned manner.

Although the system has been described thus far as responsive in its operation to energization of relay winding 42 by operation of the "X-ray control," it can be appreciated that it is frequently desirable to cause movement of the film 13 without exposure thereof to an image cast on the fluorescent screen 7. For example, in unloading the camera 14 it is necessary that all exposed film be completely wound upon the light-tight take-up reel 16 prior to removal of the reel from the camera. Consequently in order to cause movement of the film independently of operation of the "X-ray control" a push-button 73 is provided on the side of the hood 5. By reference to Figs. 4, 5 and 6, it will be noted that depression of this push-button 73 closes a circuit to the winding of relay 49 in the same manner as the contacts 46 of relay 42 previously described since the push-button 73 is in electrical parallel with such contacts as can be seen from these latter figures. Accordingly, the system will operate in the manner above described to advance the film 13 merely by the operator depressing the push-button 73 when desired.

It thus becomes obvious to those skilled in the art that a photofluoroscopic apparatus is herein provided which automatically operates to take successive individually identified exposures. Moreover, although the sensitized film aligns with the axis of the fluorescent screen and direct beam of X-rays, the film is so protected as to register only the visible light reflected on the fluorescent screen without the film being in any way impaired by the beam of X-rays. In addition, the operator is given a visual indication of the sequential operation of the apparatus so that he can readily ascertain at any moment its proper functionings.

Although one embodiment of the present invention has been shown and described it is to be understood that still further modifications thereof may be made without departing from the spirit and scope of the appended claims.

I claim:

1. A photofluoroscopic apparatus for photographing an image cast on a fluorescent screen by subjecting an object to radiation from an X-ray tube comprising a light-tight hood, a fluorescent screen at one side of said hood for registering the image cast by an object when subjected to a beam of X-rays from the tube, a camera on the opposite side of said hood provided with an electric motor for operating mechanism to intermittently advance a continuous strip film one frame at a time to dispose the frame in focal position relative to said fluorescent screen, a relay operable by operation of the X-ray tube control for closing a self-holding circuit to a second relay, a time delay motor operable by closure of said second relay after the lapse of a preselected period of time sufficient to allow the image cast on said fluorescent screen to register on the film frame to close a circuit to said camera motor with attendant operation thereof to cause advancement of the film to an unexposed frame, and a circuit interrupter operable by operation of said motor to open the self-holding circuit for said second mentioned relay with cessation of operation of said time delay and camera motors upon completion of the advance of the film to the unexposed frame.

2. A photofluoroscopic apparatus for photographing an image cast on a fluorescent screen by subjecting an object to radiation from an X-ray tube comprising a light-tight hood, a fluorescent screen at one side of said hood for registering the image cast by an object when subjected to a beam of X-rays from the tube, a camera on the opposite side of said hood provided with an electric motor for operating mechanism to intermittently advance a continuous strip film one frame at a time to dispose the frame in focal position relative to said fluorescent screen, means provided on said hood for supporting identifying indicia within the focal area of said camera, illuminating means disposed in said hood and adapted upon energization thereof to confine illumination to said indicia, a relay operable by operation of the X-ray tube control for closing a self-holding circuit to a second relay, said second relay being operable to close a circuit to said illuminating means during the casting of an image on said fluorescent screen with attendant registration of both the indicia and image on the camera film frame, a time delay motor operable by closure of said second relay after the lapse of a preselected period of time to interrupt the circuit to said illuminating means and close a circuit to said camera motor with attendant operation thereof to cause advancement of the film to an unexposed frame, and a circuit interrupter operable by operation of said motor to open the self-holding circuit for said second mentioned relay with cessation of operation of said time delay and camera motors upon completion of the advance of the film to the unexposed frame.

3. A photofluoroscopic apparatus for photographing an image cast on a fluorescent screen by subjecting an object to radiation from an X-ray tube comprising a light-tight hood, a fluorescent screen at one side of said hood for registering the image cast by an object when subjected to a beam of X-rays from the tube, a camera on the opposite side of said hood provided with an electric motor for operating mechanism to intermittently advance a continuous strip film one frame at a time to dispose the frame in direct alignment with the axes of the beam of X-rays from the tube and said fluorescent screen, means pervious to visible light and impervious to X-rays disposed between said film and said fluorescent screen to prevent X-rays from fogging the film and causing only the image cast on said fluorescent screen upon energization of the X-ray tube to register on said camera film frame, means provided on said hood for supporting identifying indicia within the focal area of said camera, illuminating means disposed in said hood and adapted upon energization thereof to confine illumination to said indicia, a relay operable by operation of the X-ray tube control for closing a self-holding circuit to a second relay, said second relay being operable to close a circuit to said illuminating means during the casting of an image on said fluorescent screen with attendant registration of both the indicia and image on the camera film frame, a time delay motor operable by closure of said second relay after the lapse of a preselected period of time to interrupt the circuit to said illuminating means and close a circuit to said camera motor with attendant operation thereof to cause advancement of the film to an unexposed frame, and a circuit interrupter operable by operation of said motor to open the self-holding circuit for said second mentioned relay with cessation of operation of said time delay and camera motors upon completion of the advance of the film to the unexposed frame.

4. A photofluoroscopic apparatus for photographing an image cast on a fluorescent screen by subjecting an object to radiation from an X-ray tube comprising a light-tight hood, a fluorescent screen at one side of said hood for registering the image cast by an object when subjected to a beam of X-rays from the tube, a camera on the opposite side of said hood provided with an electric motor for operating mechanism to intermittently advance a continuous strip film one frame at a time to dispose the frame in focal position relative to said fluorescent screen, an indicating lamp energizable with said camera motor for indicating to an operator the advancement of said film, a relay operable by operation of the X-ray tube control for closing a self-holding circuit to a second relay, a time delay motor operable by closure of said second relay after the lapse of a preselected period of time sufficient to allow the image cast on said fluorescent screen to register on the film frame to close a circuit to said indicating lamp and to said camera motor with attendant energization of said indicating lamp and operation of said camera motor to cause advancement of the film to an unexposed frame, and a circuit interrupter operable by operation of said motor to open the self-holding circuit for said second mentioned relay with cessation of operation of said time delay and camera motors upon completion of the advance of the film to the unexposed frame.

5. A photofluoroscopic apparatus for photographing an image cast on a fluorescent screen by subjecting an object to radiation from an X-ray tube comprising a light-tight hood, a fluorescent screen at one side of said hood for registering the image cast by an object when subjected to a beam of X-rays from the tube, a camera on the opposite side of said hood provided with an electric motor for operating mechanism to intermittently advance a continuous strip film one frame at a time to dispose the frame in focal position relative to said fluorescent screen, an indicating lamp energizable with said camera motor, a relay operable by operation of the X-ray tube control for closing a self-holding circuit to a second relay, a time delay motor operable by closure of said second relay after the lapse of a preselected period of time sufficient to allow the image cast on said fluorescent screen to register on the film frame to close a circuit to said indicating lamp and to said camera motor with attendant energization of said indicating lamp and operation of said camera motor to cause advancement of the film to an unexposed frame, a switch included in the circuit with said indicating lamp and intermittently operable by movement of said film to open the circuit and cause flashing of said lamp as an indication of the advancement of said film, and a circuit interrupter operable by operation of said motor after a predetermined period of time to open the self-holding circuit for said second mentioned relay and cause cessation of operation of said time delay and camera motors with de-energization of said indicating lamp upon completion of the advance of the film to the unexposed frame.

6. A photofluoroscopic apparatus for photographing an image cast on a fluorescent screen by subjecting an object to radiation from an X-ray tube comprising a light-tight hood, a fluorescent screen at one side of said hood for registering the image cast by an object when subjected to a beam of X-rays from the tube, a camera on the opposite side of said hood provided with an electric motor for operating mechanism to intermittently advance a continuous strip film one frame at a time to dispose the frame in focal position relative to said fluorescent screen, an indicating lamp energizable with said camera motor for indicating advancement of said film, means provided on said hood for supporting identifying indicia within the focal area of said camera, illuminating means disposed in said hood and adapted upon energization thereof to confine illumination to said indicia, a pilot light energizable with said illuminating means to indicate operation of the latter, a relay operable by operation of the X-ray tube control for closing a self-holding circuit to a second relay, said second relay being operable to close a circuit to said pilot light and to said illuminating means during the casting of an image on said fluorescent screen with attendant registration of both the indicia and image on the camera film frame, a time delay motor operable by closure of said second relay after the lapse of a preselected period of time to interrupt the circuit to said pilot light and said illuminating means and close a circuit to said indicating lamp and to said camera motor with attendant energization of said indicating lamp and operation of said camera motor to cause advancement of the film to an unexposed frame, a switch included in the circuit with said indicating lamp and intermittently operable by advancement of said film to open the circuit and cause flashing of said lamp as an indication of film advancement, and a circuit interrupter operable by operation of said motor after a predetermined period of time to open the self-holding circuit for said second mentioned relay and cause cessation of operation of said time delay and camera motors with deenergization of said indicating lamp upon completion of the advance of the film to the unexposed frame.

7. A photofluoroscopic apparatus for photographing an image cast on a fluorescent screen by subjecting an object to radiation from an X-ray tube comprising a light-tight hood, a fluorescent screen at one side of said hood for registering the image cast by an object when subjected to a beam of X-rays from the tube, a camera on the opposite side of said hood provided with an electric motor for operating mechanism to intermittently advance a continuous strip film one frame at a time to dispose the frame in direct alignment with the axes of the beam of X-rays from the tube and said fluorescent screen, an indicating lamp energizable with said camera motor for indicating advancement of said film, means pervious to visible light and impervious to X-rays disposed between said film and said fluorescent screen to prevent X-rays from fogging the film and causing only the image cast on said fluorescent screen upon energization of the X-ray tube to register on said camera film frame, means provided on said hood for supporting identifying indicia within the focal area of said camera, illuminating means disposed in said hood and adapted upon energization thereof to confine illumination to said indicia, a pilot light energizable with said illuminating means to indicate operation of the latter, a relay operable by operation of the X-ray tube control for closing a self-holding circuit to a second relay, said second relay being operable to close a circuit to said pilot light and to said illuminating means during the casting of an image on said fluorescent screen with attendant registration of both the indicia and image on the camera film frame, a time delay motor operable by closure of said second relay after the lapse of a preselected period of time to interrupt the circuit to said pilot light and said illuminating means and close a circuit to said indicating lamp and to said camera motor with attendant energization of said indicating lamp and operation of said camera motor to cause advancement of the film to an unexposed frame, a switch included in the circuit with said indicating lamp and intermittently operable by advancement of said film to open the circuit and cause flashing of said lamp as an indication of film advancement, and a circuit interrupter operable by operation of said motor after a predetermined period of time to open the self-holding circuit for said second mentioned relay and cause cessation of operation of said time delay and camera motors with de-energization of said indicating lamp upon completion of the advance of the film to the unexposed frame.

CHESTER B. LAND.

REFERENCES CITED

The following references are of record in the file of this patent:

UNITED STATES PATENTS

| Number | Name | Date |
|---|---|---|
| 2,298,942 | Hicks | Oct. 13, 1942 |
| 2,205,853 | Jany | June 25, 1940 |
| 2,321,156 | Powers | June 8, 1943 |
| 2,331,225 | Powers | Oct. 5, 1943 |
| 2,337,722 | Konigsberg | Dec. 28, 1943 |

FOREIGN PATENTS

| Number | Country | Date |
|---|---|---|
| 318,152 | Great Britain | July 31, 1930 |
| 557,050 | Great Britain | Nov. 2, 1943 |